United States Patent [19]

Hayashi et al.

[11] Patent Number: 5,023,649
[45] Date of Patent: Jun. 11, 1991

[54] EXPOSURE CONTROLLING APPARATUS OF A CAMERA HAVING A PLURALITY OF AREAS FOR MEASURING BRIGHTNESS

[75] Inventors: Kohtaro Hayashi; Toshihiko Karasaki; Yasuteru Yamano; Hiromu Mukai; Koji Hata; Masayuki Ikemura, all of Osaka, Japan

[73] Assignee: Minolta Camera Kabushiki Kaisha, Osaka, Japan

[21] Appl. No.: 340,459

[22] Filed: Apr. 19, 1989

[30] Foreign Application Priority Data

Apr. 20, 1988 [JP] Japan ................ 63-97776
Apr. 20, 1988 [JP] Japan ................ 63-97777

[51] Int. Cl.$^5$ .................. G03B 7/08; G03B 7/099
[52] U.S. Cl. .................... 354/434; 354/476
[58] Field of Search ............. 354/429, 432, 433, 434, 354/476

[56] References Cited

U.S. PATENT DOCUMENTS

| | | | |
|---|---|---|---|
| 4,306,787 | 12/1981 | Fukuhara et al. | 354/432 |
| 4,455,071 | 6/1984 | Kato et al. | 354/431 |
| 4,456,354 | 6/1984 | Mizokami | 354/414 |
| 4,527,881 | 7/1985 | Sugawara | 354/432 |
| 4,566,775 | 1/1986 | Tsunekawa | 354/432 |
| 4,690,536 | 9/1987 | Nakai et al. | 354/402 |
| 4,821,074 | 4/1989 | Nakai et al. | 354/432 |

FOREIGN PATENT DOCUMENTS

| | | |
|---|---|---|
| 55-52035 | 10/1978 | Japan . |
| 58-100839 | 12/1981 | Japan . |
| 58-113917 | 12/1981 | Japan . |
| 61-279829 | 6/1985 | Japan . |
| 61-45686 | 3/1986 | Japan . |
| 62-203141 | 3/1986 | Japan . |
| 63-5331 | 6/1986 | Japan . |

OTHER PUBLICATIONS

"Olympus OM-PC: The Camera with ESP", *Photographic*, Nov. 1985.
"Olympus OM-PC: Multi-Pattern Exposure Correction in a Moderately Priced 35 MM SLR", *Modern Photography*, Apr. 1986.

*Primary Examiner*—L. T. Hix
*Assistant Examiner*—Cassandra C. Spyrou
*Attorney, Agent, or Firm*—Burns, Doane, Swecker & Mathis

[57] ABSTRACT

Brightness of a central area in a scene to be photographed and brightness of a peripheral area around the central area are measured, and the brightnesses of respective areas are outputted as first and second values. When the second value is larger than the first value, the first value is corrected by a value which has no relation with the respective measured values. Consequently, a proper controlling brightness value is provided for controlling the exposure.

34 Claims, 7 Drawing Sheets

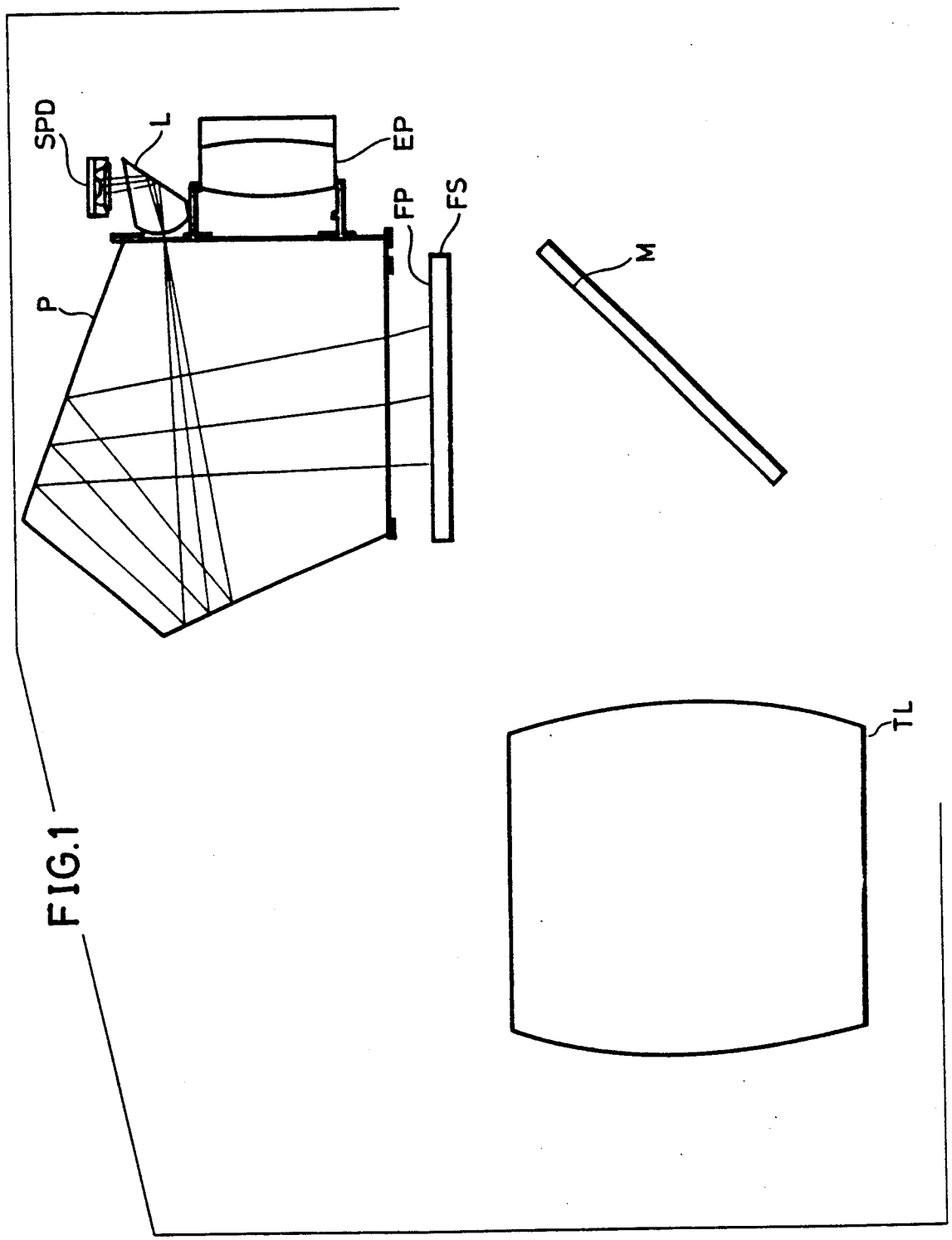

$\beta = 1/15$ $\beta = 1/50$ $\beta = 1/80$

EXPOSURE CONTROLLING APPARATUS OF A CAMERA HAVING A PLURALITY OF AREAS FOR MEASURING BRIGHTNESS

BACKGROUND OF THE INVENTION

1. Field of the Invention

The present invention relates to a camera and, more specifically, to an exposure controlling apparatus of a camera having a plurality of areas for measuring brightness.

2. Description of the Related Art

In an exposure controlling apparatus of a camera having a plurality of areas for measuring brightness, a method for measuring brightness has been proposed in which a suitable controlling brightness value is provided by calculating weighted mean of measured brightness values of respective areas. Coefficients (weight coefficients) multiplied by the respective measured brightness values include zero but not negative numbers. Therefore, the controlling brightness value will be an intermediate value between the maximum and the minimum values of the measured brightness values of the areas.

It is proposed in Japanese Patent Laying-Open Gazette No. 279829/1986 that a plurality of arithmetic expressions for weighted mean should be prepared in advance and the expression employed is switched in accordance with the photographing magnification in the above described method for measuring brightness.

In an exposure controlling apparatus of a camera having a plurality of areas for measuring brightness, how to determine the controlling brightness value for controlling exposure from the brightness values measured at the plurality of areas in order to provide best exposure is an important concern. In the above mentioned Japanese Patent Laying-Open Gazette No. 279829/1986, weighted mean equations for calculating the controlling brightness value from respective measured brightness values are switched in accordance with the photographing magnification so as to properly control the exposure, on the understanding that the optimal controlling brightness value can be provided by proper weighted mean of respective measured brightness values.

However, according to an analysis of various photographs with the photographing conditions changed variously, that is, with the subject distance, the focal length of the taking lens, the photographing magnification changed variously for different distribution of brightness, the optimal controlling brightness value can not always be calculated by the weighted mean of respective measured brightness values. The optimal controlling brightness value is often provided by applying to the measured brightness value an exposure correction which is determined independent from the absolute value of the measured brightness. Especially when a subject is to be photographed with rear light, with the brightness at the peripheral portion brighter than the brightness of a central portion by about +1.5 to 2.5 EV, the best controlling brightness value may not exist between the maximum value and the minimum value of the measured brightness obtained at respective areas for measuring brightness. In such cases, optimal exposure controlling can not be realized in the prior art.

When there is a big difference between the brightness of a main subject at the center and the brightness of the background at the periphery, as is often the case of photographs with rear light, if the controlling brightness value for controlling the exposure is determined by averaged brightness measuring, center-weighted measuring, or other measuring employing arbitrary weighted mean, then the controlling brightness value always becomes higher than the measured brightness value of the main subject, whose brightness is low. Consequently, the exposure for the main subject tends to be insufficient and the main subject will be dark as a shadow. Namely, proper exposure for the main subject can not be provided. In view of the foregoing, it is recommended that the low brightness of the main subject is employed as the control brightness value for controlling exposure by spot metering of a small area at the center in taking photographs with rear light.

Similarly, in taking a photograph in accordance with so called shadow reference exposure in which the brightness of a dark portion in the scene to be photographed is measured by spot metering and the measured value is used as the black level, when a white subject exists near the area for the spot metering, the result of the spot metering does not exactly correspond to the brightness of the dark portion but comprises an error in the brighter side. The inventors of the present invention studied also employing statistical analysis how the errors in measuring brightness change under various conditions. Consequently, it is found by the inventor that the error in spot metering is determined based on prescribed conditions which has relation neither with the absolute value of the spot measured brightness value nor with the absolute value of the measured brightness of the peripheral portions.

SUMMARY OF THE INVENTION

An object of the present invention is to provide suitable exposure in an exposure controlling apparatus of a camera having a plurality of areas for measuring brightness.

Another object of the present invention is to provide suitable exposure even when there is a large difference between measured brightness values provided in respective areas, in an exposure controlling apparatus of a camera having a plurality of areas for measuring brightness.

A further object of the present invention is to provide suitable exposure in photographing a subject with rear light, in an exposure controlling apparatus of a camera having a plurality of areas for measuring brightness.

A still further object of the present invention is to provide a suitable exposure in taking photographs with shadow reference exposure, in an exposure controlling apparatus of a camera having a plurality of areas for measuring brightness.

The above described objects of the present invention can be attained by a controlling apparatus of the present invention comprising first brightness measuring means, second brightness measuring means, comparing means, correcting means and means for detecting photographing magnification. The first brightness measuring means measures brightness of a first area and outputs a first value corresponding to the brightness. The second brightness measuring means measures brightness of a second area around the first area and outputs a second value corresponding to the brightness. The comparing means compares the first and second values. The photographing magnification detecting means detects the photographing magnification. The correcting value setting means sets a correcting value in accordance with the photographing magnification detected by the photographing magnification detecting means. The correcting means corrects the first value by the correcting value when it is determined by the comparing means that the second value is larger than the first value.

In an aspect, the above described objects of the present invention can be attained by an exposure controlling apparatus of the present invention comprising first brightness measuring means, second brightness measuring means, comparing means, correcting means and prohibiting means. The first brightness measuring means measures brightness of a first area and outputs a first value corresponding to the brightness. The second brightness measuring means measures brightness of a second area around the first area and outputs a second value corresponding to the brightness. The comparing means compares the first and second values. The correcting means corrects the first value by a prescribed value, when it is determined by the comparing means that the second value is larger than the first value. The prohibiting means prohibits correction by the correcting means under prescribed conditions which are independent from the first value.

In the exposure controlling apparatus structured as described above, the measured brightness value is corrected, or the correction is prohibited in accordance with the measured brightness values of respective areas, so that a proper exposure can be provided regardless of various photographing conditions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing a brightness measuring optical system of a single lens reflex camera in accordance with one embodiment of the present invention;

DESCRIPTION OF THE PREFERRED EMBODIMENTS

FIG. 1 is a schematic diagram showing a brightness measuring optical system of a single lens reflex camera in accordance with one embodiment of the present invention. Light reflected from the subject passes through a taking lens TL and is reflected by a quick return mirror M to be formed on a focal plane FP of a focussing screen FS. The image of the subject formed on the focal plane FP is turned into an erect image through the pentagonal prism P, which is monitored through an eye piece EP. A brightness measuring lens L arranged near the eye piece EP is adapted such that the focal plane FP and the light receiving surface of the brightness measuring element SPD are in conjugation. Therefore, the object images formed on the focal plane FP are reduced and projected on the brightness measuring element SPD. The brightness measuring element SPD is divided into a plurality of brightness measuring elements SPDi (i=1, 2, ...), so that the object images are divided into a plurality of images, and the brightness of each of the images can be measured independently.

Figure 2A:
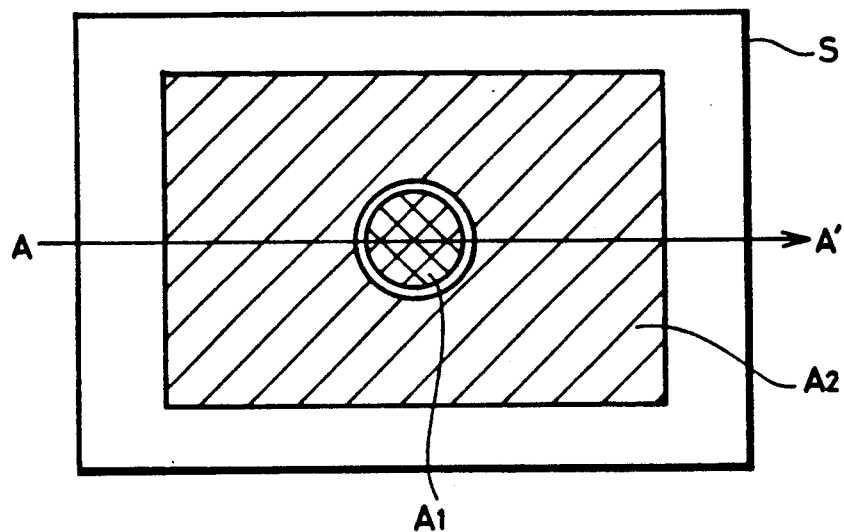
FIG. 2A shows a plane to be photographed divided into a central area for brightness measuring and a peripheral area for brightness measuring, in accordance with one embodiment of the present invention.

FIG. 2A is an example of a scene to be photographed which is divided into a central area A1 for measuring brightness and a peripheral area A2 for measuring brightness. The light receiving surface of the brightness measuring element SPD shown in FIG. 1 are divided into portions corresponding to the areas A1 and A2 for measuring brightness. Respective divided surfaces are represented as brightness measuring elements SPD1 and SPD2. The measured brightness values measured by the respective brightness measuring elements SPD1 and SPD2 are converted into the APEX value BV to be represented as $BV_c$ and $BV_0$.

Figure 2B:
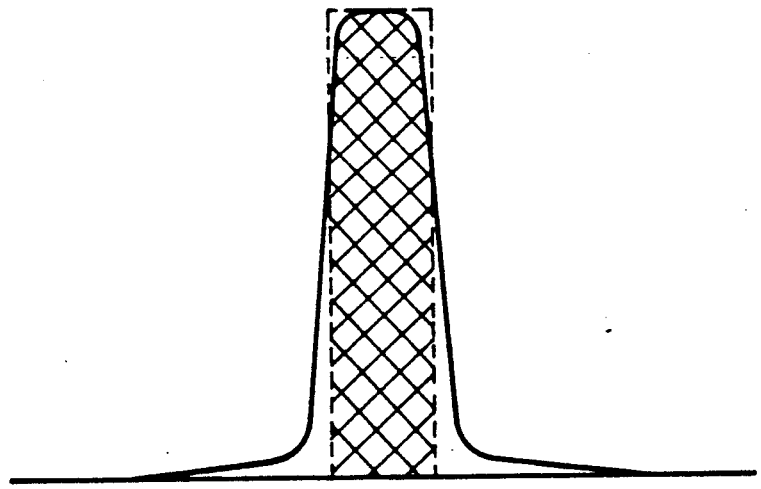
FIG. 2B shows distribution of brightness measuring sensitivity of a brightness measuring element on the line A—A' of FIG. 2A.
Figure 2C:
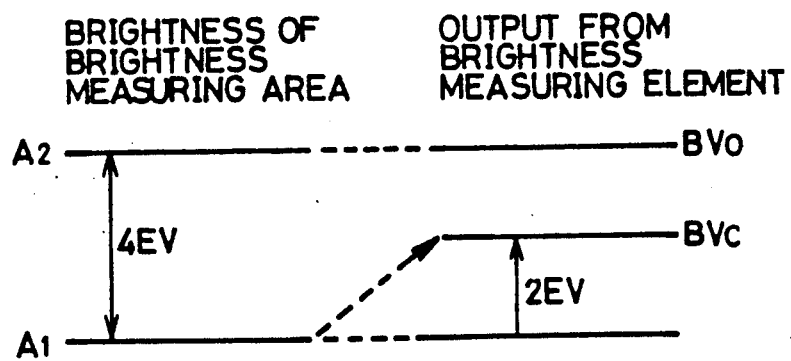
FIG. 2C shows a change of the value of brightness measured by the brightness measuring element, influenced by the brightness of the area A2.

FIG. 2B shows the distribution of sensitivity in measuring brightness of the brightness measuring element SPD1 on the line A—A' shown in FIG. 2A. The ideal distribution of sensitivity in measuring brightness is represented by the dotted line. However, actually the distribution of sensitivity in measuring brightness is such as represented by the solid line, since there is some divergency caused by aberration, and flare of the optical system for measuring light, leak current in the brightness measuring element SPD1 itself and so on. Now, let us assume that the integrated value of the sensitivity in the brightness measuring area A1 (cross hatched portion in FIG. 2B) occupies 80% of the total integrated value of the sensitivity in measuring brightness of the brightness measuring element SPD1. If the brightness in the peripheral area A2 of the scene to be photographed is brighter than that of the central area A1 by +4 EV, then the measured brightness value $BV_0$ measured by the brightness measuring element SPD2 will be approximately the same as the true brightness of the brightness measuring area A2. However, the measured brightness value $BV_c$ from the brightness measuring element SPD1 is brighter than the true brightness of the area A1 by +2 EV under the influence of the brightness of the area A2, as shown in FIG. 2C.

The same phenomenon may occur on the measured brightness value $BV_0$ of the peripheral area when the brightness of the peripheral area A2 is darker than that of the central area A1. However, the influence of the brightness of the central area A1 is small, since the light receiving area of peripheral brightness measuring element SPD2 is larger than that of the central brightness measuring element SPD1.

In view of the foregoing, the influence of the peripheral brightness to the value $BV_c$ of the central brightness will be discussed in the following.

Figure 3A:
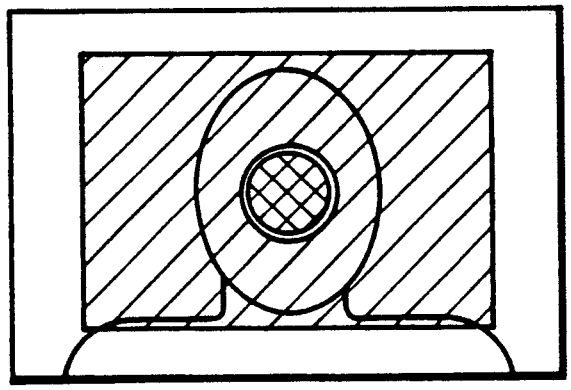
FIGS. 3A to 3C show a subject parson with various magnification, superimposed on FIG. 2A.
Figure 3B:
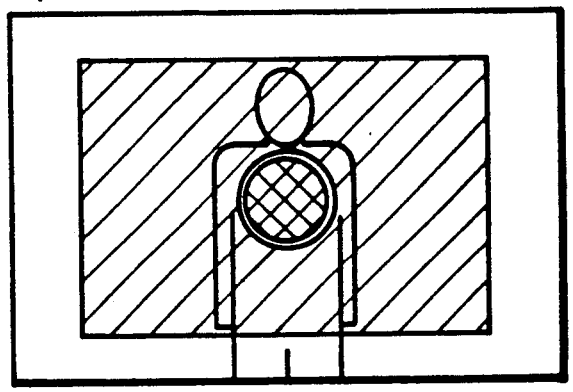
Figure 3C:
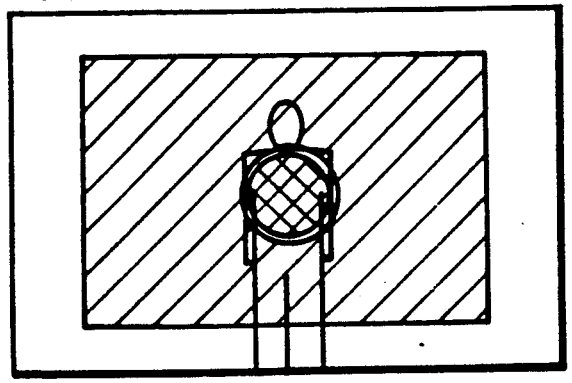

(i) When the magnification $\beta$ is changed FIGS. 3A to 3C show images of a person with the photographing magnification $\beta$ being 1/15, 1/50 and 1/80, respectively, superimposed on FIG. 2A. As shown in respective figures, when the magnification $\beta$ of the main subject is larger than 1/100, the main subject may be, in most case, as big as a person. And, generally the main subject is approximately at the center of the photographing area. In photographing a scene with rear light, that is, in case that the brightness of the main subject such as a person is lower than that of the peripheral portions, when the photographing magnification $\beta$ is high as shown in FIG. 3A and the main subject is relatively large compared with the area A1 for measuring brightness, the influence of the peripheral brightness to the value $BV_c$ of the central brightness is small. Therefore, when the photographing magnification $\beta$ is high, the amount of correction for the controlling brightness value may be small. However, if the photographing magnification is so small that the main subject barely includes the brightness measuring area Al as shown in FIG. 3C, the measured brightness value $BV_c$ of the central brightness becomes higher than the true brightness of the main subject due to the influence of the higher brightness of the peripheral portions caused by the divergence of the sensitivity in measuring brightness, as described above. Therefore, when the photographing magnification $\beta$ is low, the amount of correction for the controlling brightness value must be large. When the photographing magnification $\beta$ is an intermediate value as shown in FIG. 3B, the amount of correction for the controlling brightness value must be set at an intermediate value.

(ii) When the difference $BV_{0c}$ of the measured brightness values is changed

The influence of the peripheral brightness to the measured brightness value $BV_c$ at the central portion differs also dependent on the difference $BV_{0c}$ $(=BV_0-BV_c)$ between the value $BV_c$ of the central brightness and the value $BV_0$ of the peripheral brightness. In the brightness measuring element SPD1 having said distribution of sensitivity in measuring brightness as shown in FIG. 2B, the value $BV_c$ of the central brightness is most influenced by the peripheral brightness when the difference $\Delta BV_{0c}$ is about 1.5 EV to 2.5 EV. Therefore, when the difference $\Delta BV_{0c}$ is in this range, the amount of correction for the controlling brightness value must be set large. When the difference $\Delta BV_{0c}>2.5$ EV, generally, the main subject is larger than a person and entirely includes the area A1, so that we can consider that the value $BV_c$ of the central brightness is approximately corresponding to the brightness of the main subject. Therefore, when the difference $\Delta BV_{0c}$ is larger than 2.5 EV, the amount of correction for the controlling brightness value must be set smaller. When the difference $\Delta BV_{0c}<1$ EV, we can consider that the scene is not in rear light condition, so that there is no need to correct the controlling brightness value. If the difference $\Delta BV_{0c}$ is in the range of 1 EV to 1.5 EV, the amount of correction for the controlling brightness value must be set smaller than when the difference $\Delta BV_{0c}$ is in the range of 1.5 EV to 2.5 EV.

If the value of correction for the controlling brightness value is set in accordance with the conditions such as shown in the foregoing (i), (ii), the possibility of providing optimal exposure will be increased. Specific examples of hardware and software for carrying out such exposure control will be described in the following.

Figure 4:
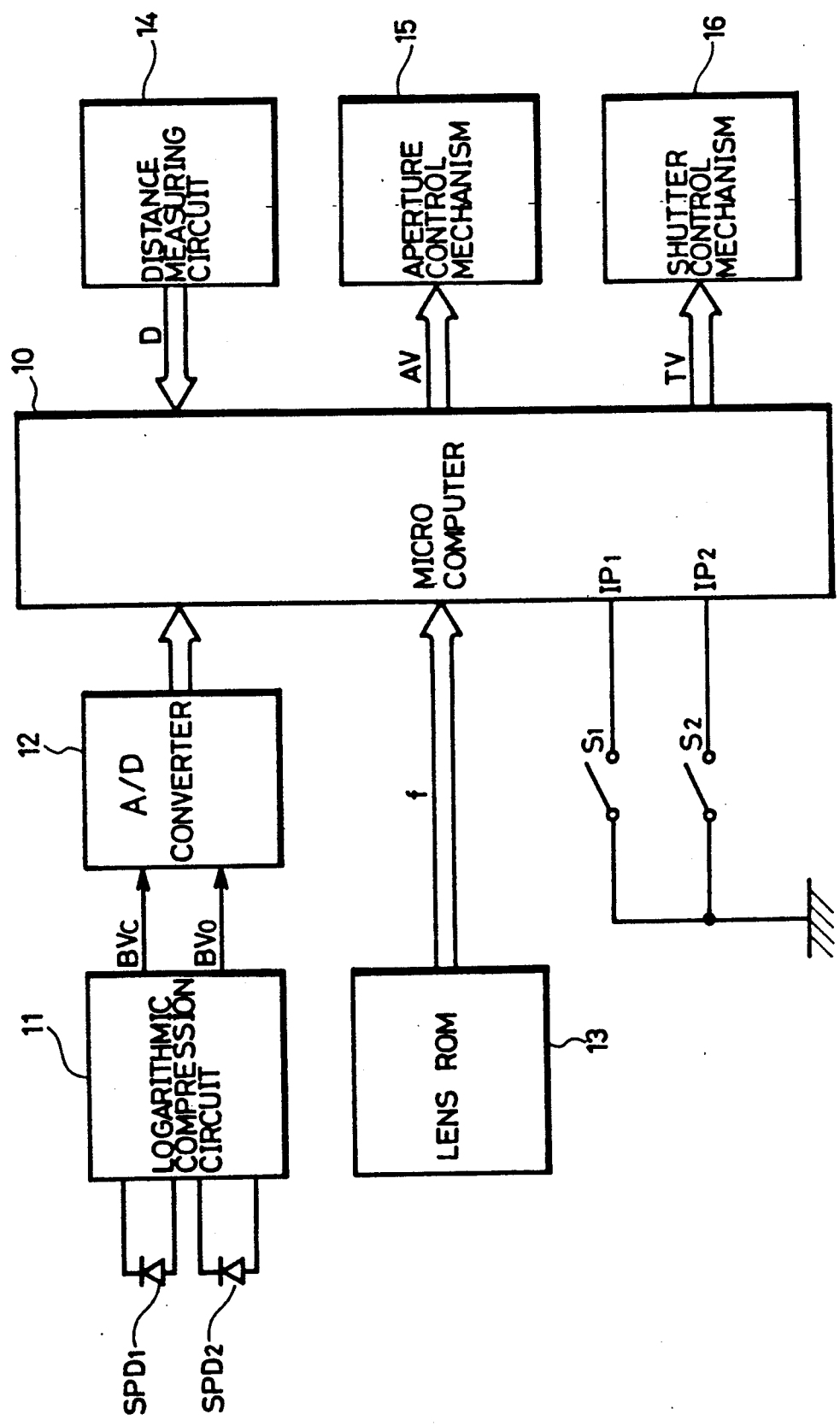
FIG. 4 is a block diagram of a controlling portion of a camera in accordance with one embodiment of the present invention.

FIG. 4 is a block diagram of a circuit in a camera in accordance with one embodiment of the present invention. In the figure, the reference character $S_1$ represents a brightness measuring switch and $S_2$ represents a release switch. The former switch is turned ON by a first stroke of a shutter button (not shown) while the latter switch is turned ON by a second stroke of the shutter button. The switch $S_1$ has one end connected to the ground and the other end connected to an input port IP1 of a microcomputer 10. The switch $S_2$ has its one end connected to the ground and the other end connected to the input port IP2. A logarithmic compression circuit 11 logarithmically compresses the measured brightness values from the brightness measuring elements SPD1 and SPD2 of the camera to output the same as the measured brightness values BVc and $BV_0$ corresponding to the BV values in the APEX system. The outputs from logarithmic compression circuit 11, which are analog signals, are converted into digital signals by an A/D converter 12 to be inputted to the microcomputer 10. A lens ROM 13 contained in the taking lens stores information such as focal length f of the lens and so on, which lens data can be inputted to the microcomputer 10.

A distance measuring circuit 14 provides information in association with the subject distance D to input the same to the microcomputer. A diaphragm controlling mechanism 15 controls the diaphragm of the taking lens in accordance with the data of the aperture value AV outputted from the microcomputer 10. A shutter controlling mechanism 16 controls the shutter speed in accordance with the data of the exposure time TV outputted from the microcomputer 10.

Figure 5:
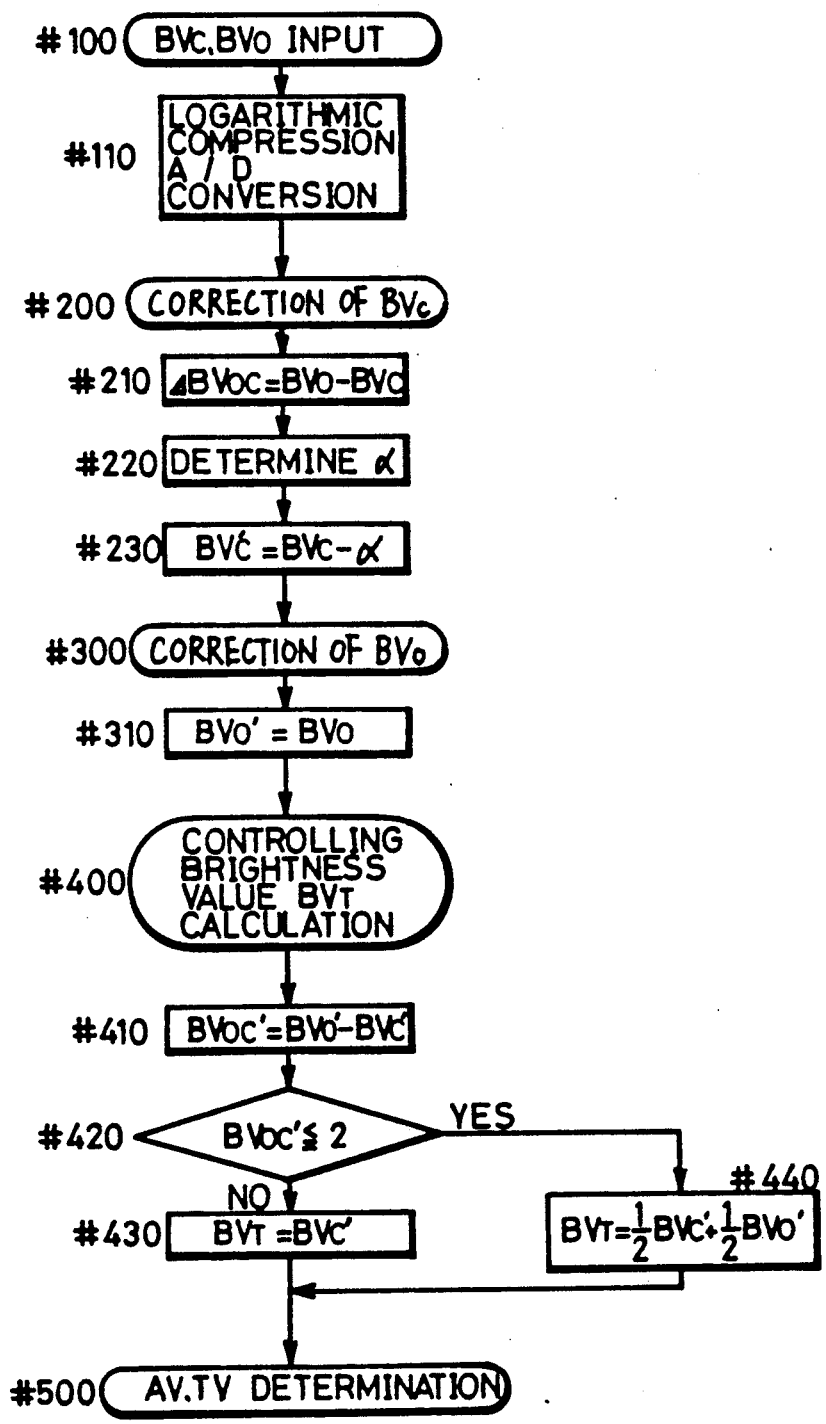
FIG. 5 is a flowchart showing the content of the program carried out by the microcomputer in FIG. 4.

FIG. 5 is a flowchart showing the content of the program carried out by the microcomputer 10 of FIG. 4. Portions which are not directly related to the calculation of exposure are omitted. When the brightness measuring switch $S_1$ is turned on, the microcomputer 10 starts the operation from the step #100.

Brief description will be given in accordance with the flow of control. In the step #100, the value $BV_c$ of the central brightness and the value $BV_0$ of the peripheral brightness are respectively inputted. In the step #200, correction for the value $BV_c$ of the central brightness is carried out to provide the true central brightness $BV_c'$. In the step #300, correction for the value $BV_0$ of the peripheral brightness is carried out to provide the true peripheral brightness $BV_0'$. In the step #400, the controlling brightness value $BV_T$ is calculated based on the true central brightness $BV_c'$ and the true peripheral brightness $BV_0'$. In the step #500, the aperture value AV and the exposure time TV are determined based on the controlling brightness value $BV_T$.

Now, each of the process steps will be described in detail.

In the step #100, the measured brightness value $BV_c$ of the central brightness and the measured value $BV_0$ of the peripheral brightness are respectively inputted. For this purpose, the output from the brightness measuring element SPD1 corresponding to the central area A1 for measuring brightness and the output from the brightness measuring element SPD2 corresponding to the peripheral area A2 are respectively converted into the BV values in the APEX system by means of the logarithmic compression circuit 11, which analogue values are converted into digital signals by the A/D converting circuit 12 to be inputted to the microcomputer 10 in the step #110.

In the step #200, correction for the measured value $BV_c$ of the central brightness is carried out to provide the true central brightness $BV_c'$. For this purpose, in the step #210, the difference $\Delta BV_{0c} = BV_0 - BV_c$ between the measured value $BV_c$ of the central brightness and the measured value $BV_0$ of the peripheral brightness is calculated. If the difference $\Delta BV_{0c}$ is larger than +1 EV, the scene is with the rear light. In that case, the measured value $BV_c$ of the central brightness is influenced by the peripheral brightness and therefore it is different from the true central brightness $BV_c'$. Therefore, in the step #220, a correction value $\alpha$ for offsetting the influence of the peripheral brightness is determined. More specifically, the information in association with the focal distance f of the taking lens is inputted from the lens ROM 13 to the microcomputer 10 and the information in association with the subject distance D is inputted from the distance measuring circuit 14 to the microcomputer 10, respectively. By the operation of $\beta = f/D$ in the microcomputer 10, the photographing magnification $\beta$ is calculated. By using the photographing magnification $\beta$ and the above mentioned difference $\Delta BV_{0c}$ of the measured brightness values, a two dimensional matrix table as shown in the following table 1 is accessed to provide the correction value $\alpha$. For example, when $\beta = 1/50$ and $\Delta BV_{0c} = 2.0$ EV, then $\alpha = 0.75$. The correction value $\alpha$ is determined to offset the influence of the peripheral brightness in accordance with the above mentioned conditions (i) and (ii). In the step #230, the correction value $\beta$ is subtracted from the measured value $BV_c$ of the central brightness, thereby offsetting the influence of the central brightness to provide the true central brightness $BV_c'$.

TABLE 1

| $\Delta BV_{0c}$ | $\beta$ | | | |
|---|---|---|---|---|
| | 1/20 | 1/60 | 1/100 | |
| | 0 | 0 | 0 | 0 |
| 1 | | | | |
| | 0.25 | 0.375 | 0.5 | 0 |
| 1.5 | | | | |
| | 0.5 | 0.75 | 1 | 0 |
| 2.5 | | | | |
| | 0.25 | 0.375 | 0.5 | 0 |

In the table 1, $\alpha$ is set at 0 when the photographing magnification $\beta$ is smaller than 1/100. The reason for this is that the photographs taken with the magnification $\beta < 1/100$ are, in most cases, landscapes so that the main subject is large compared with the central area A1 for measuring brightness. In such case, if the measured value $BV_c$ of the central brightness is corrected, the measurement might be erroneous.

If the distance measuring circuit 14 is a focus detecting circuit of the TTL phase difference detecting type, for example, in which the amount of forward movement of the lens is determined in accordance with the defocus amount, the magnification $\beta$ may be calculated in accordance with the operation $\beta = x/f$, in which x represents the object distance corresponding to the amount of forward movement of the lens in the in-focused state and f represents the focal length of the taking lens. If a lens whose focal length can not be changed or a zoom whose zoom ratio is relatively small is uninterchangeably mounted on the camera, it goes without saying that the correcting value $\alpha$ may be calculated by using the object distance d or the amount of forward movement of the lens x in the in-focused state instead of the photographing magnification $\beta$.

In the step #300, correction for the measured value $BV_0$ of the peripheral brightness is carried out to provide the true peripheral brightness $BV_0'$. More specifically, when $BV_0 < BV_c$, the measured value $BV_0$ of the peripheral brightness must have been influenced by the central brightness, so that correction for offsetting the influence is carried out. However, in this embodiment having such brightness measuring areas A1 and A2 as shown in FIG. 3A, since the area of the brightness measuring area A2 in the peripheral portion is considerably larger than that of the central area A1, the influence of the central brightness is so small that it can be neglected. Therefore, in the step #310, the measured value $BV_0$ of the peripheral brightness is used as the true peripheral brightness $BV_0'$.

In the step #400, the controlling brightness value $BV_T$ is calculated in accordance with the true central brightness $BV_c'$ and the true peripheral brightness $BV_0'$. For this purpose, in the step #410, the difference $\Delta BV_{0c}'$ between the corrected true central brightness $BV_c'$ and the true peripheral brightness $BV_0'$, that is, $\Delta BV_{0c}' = BV_0' - BV_c'$, is calculated. In the step #420, whether the difference $\Delta BV_{0c}'$ is greater than 2 EV or not is determined. If $\Delta BV_{0c}' > 2$, that is, the true peripheral brightness $BV_0'$ is brighter than the true central brightness $BV_c'$ by +2 EV, the scene is with rear light, so that the true central brightness $BV_c'$ is selected to be the controlling brightness value $BV_T$ in the step #430. As a result, the optimal exposure can be applied to the main subject. If $\Delta BV_{0c}' \leq 2$, it is determined that the scene is without rear light, so that the arithmetic mean of the central brightness $BV_c'$ and the peripheral brightness $BV_0'$ is calculated to be the controlling brightness value $BV_T$ in the step #440. This is because the central brightness $BV_c'$ may possibly fluctuate due to the movement of the main subject and so on. Accordingly, it is possible to measure brightness in larger area by employing the mean of the central brightness $BV_c'$ and the peripheral brightness $BV_0'$ instead of employing only the central brightness $BV_c'$. However, since the central area A1 is considerably smaller than the peripheral area A2, averaged brightness measuring is carried out with the central portion given priority.

In the step #500, the aperture value AV and the exposure time TV are determined based on the controlling brightness $BV_T$. More specifically, since the TTL open aperture metering is employed as shown in FIG. 1 in this embodiment, the open aperture value $AV_0$ read from the lens ROM 13 is subtracted from the controlling brightness value $BV_T$ and film speed SV is added thereto to calculate the controlling exposure value EV $(=BV_T - AV_0 + SV)$. The aperture value AV and the exposure time TV are determined so that $AV + TV = EV$.

Figure 6:
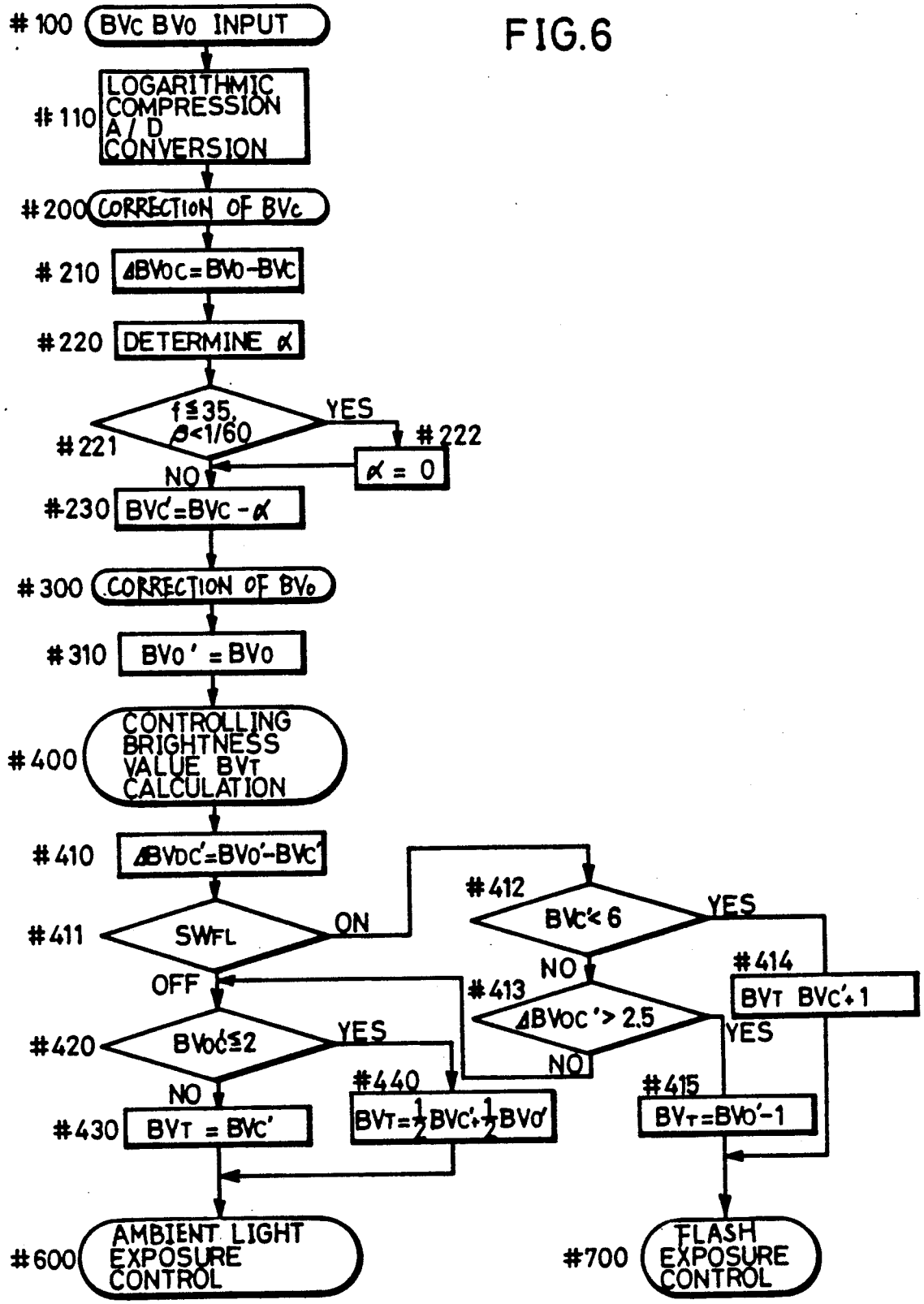
FIG. 6 is a flowchart showing an operation of a microcomputer in accordance with another embodiment of the present invention.

FIG. 6 is a flowchart showing the operation of another embodiment of the present invention.

In this embodiment, portions corresponding to the former embodiment are represented by the same step numbers and the description thereof will be omitted. This embodiment shown in FIG. 6 is different from the embodiment shown in FIG. 5 in that the range in which the correction value $\alpha$ is 0 is widened when the focal length f of the taking lens is less than or equal to 35 mm and in that the employment of electric flash is considered in calculating the controlling brightness value $BV_T$. These differences will be described in the following.

In this embodiment, the correction value $\alpha$ is determined in the step #220 and whether the focal length f of the taking lens is greater than 35 mm or not and whether the photographing magnification $\beta$ is smaller than 1/60 or not are checked in the step #221. If it is determined that $f \leq 35$ mm and $\beta < 1/60$ in the step #221, then the correcting value $\alpha$ is forced to be 0 in the step #222. The reason for this is that even if the photographing magnification $\beta$ is relatively large, the scene to be photographed are often landscapes, with the focal length f being less than or equal to 35 mm. In such case, the correction value $\alpha$ is set at 0 not only in the range of $\beta < 1/100$ but also in the range of $1/100 \leq \beta < 1/60$.

The steps after the step #400, where the controlling brightness value $BV_T$ is calculated, is explained. At first, whether the flash switch $SW_{FL}$ (not shown) is turned ON or not is checked in the step #411. If the flash switch $SW_{FL}$ is OFF, then the processes of the steps #420 to #440 are carried out as in the embodiment of FIG. 5 and the flow proceed to the ambient light exposure controlling routine of the step #600. If the flash switch $SW_{FL}$ is ON, flash light is automatically emitted when the brightness is low or when the scene with rear light is to be photographed. For this purpose, whether the central brightness $BV_c'$ is smaller than 6 EV or not is determined in the step #412. If $BV_c' < 6$ EV, it is determined that the brightness of main subject is low, the controlling brightness value is made $BV_T = BV_c' + 1$ in the step #414, and the flow proceeds to the flash exposure controlling routine of #700. In this routine, the aperture value AV and the shutter speed TV are controlled such that the main subject is under exposed by 1 EV with only ambient light. The flash light makes up for the insufficiency in brightness for the main subject.

If $BV_c' \geq 6$, it is determined that the brightness of the main subject is not low. In that case, whether the difference $\Delta BV_c' (= BV_0' - BV_c')$ between the central brightness value $BV_c'$ and peripheral brightness $BV_0'$ is larger than 2.5 EV or not is determined in the step #413 in order to determine whether the scene is with rear light or not. If the difference $\Delta BV_{0c}' \leq 2.5$ EV, it is determined that the scene to be photographed is not in the rear light state, so that the processes of the steps #420 to #440 are carried out as in the embodiment of FIG. 5 and the flow proceeds to the ambient light exposure controlling routine in the step #600. If $\Delta BV_{0c}' > 2.5$ EV, it is determined that the scene to be photographed is in the rear light state, so that the controlling brightness value $BV_T$ is calculated by the equation $BV_T = BV_0' - 1$ in the step #415, and the flow proceeds to the flash exposure controlling routine in #700. Accordingly, under the rear light condition, the background is overexposed by 1 EV and the main subject is under exposed by $(\Delta BV_{0c}' - 1)$EV with only ambient light. Flash light makes up for the insufficiency in brightness for the main subject, so that both the main subject and the ground are taken in the latitude of the film. Consequently, the main subject is properly exposed with both ambient light and flash light and the background is overexposed by 1/EV, so that the resulting photograph well reproduces the characteristics of the scene with rear light.

Figure 7:
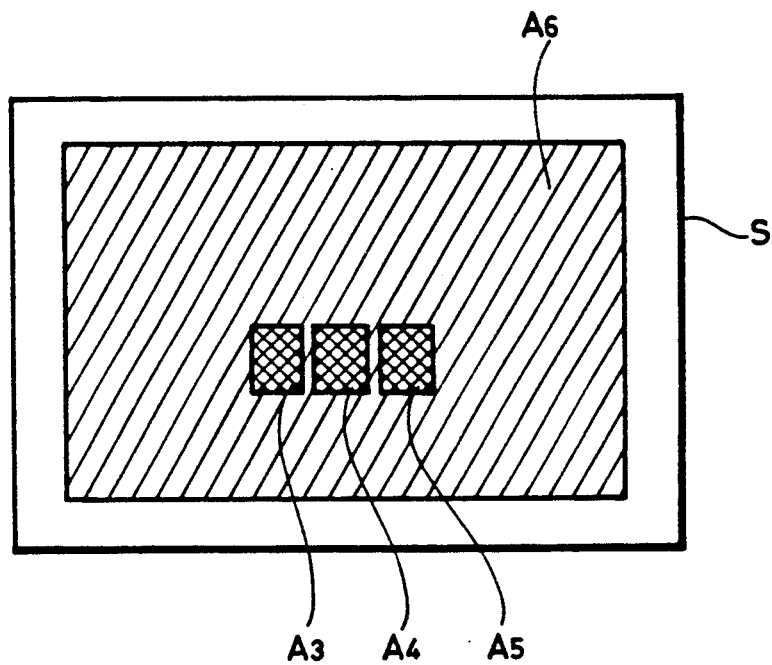
FIG. 7 shows an example of division of a plane to be photographed in accordance with a further embodiment of the present invention, applied to a camera of multipoint distance measuring and multipoint brightness measuring type.

FIG. 7 shows an example of division of the photographing field S to be photographed relating to a further embodiment of the present invention, which is applied to a camera employing multipoint distance measuring device and multipoint brightness measuring device. The brightness value from the brightness measuring element corresponding to three brightness measuring areas A3, A4 and A5 converted into BV values in the APEX system are represented as $BV_x$, $BV_y$ and $BV_z$, respectively. The measured value from the brightness measuring element corresponding to the area A6 for measuring brightness of the wide range around the above mentioned areas A3, A4 and A5 converted into the BV values of APEX system is represented as the value $BV_0$ of the peripheral brightness. The multipoint distance measuring circuit 14 measures distance of an object located in each of areas A3, A4 and A5 independently. One of the areas A3, A4 and A5 for measuring brightness is selected as an area for determining in-focus by an automatic selecting algorithm or by manual operation. If the brightness value of an area which is selected is employed as the measured value $BV_c$ of the central brightness, then the correction value $\alpha$ can be determined based on the difference $\Delta BV_{0c}$ of the brightness values and the photographing magnification $\beta$ in the same manner as described with reference to the above embodiment, and the true central brightness $BV_c'$ can be calculated by subtracting the correcting value $\alpha$ from the measured value $BV_c$.

Although only one means is used for measuring brightness of the peripheral portion in the above described embodiment, a plurality of means may be employed for measuring the brightness of the peripheral portion. For example, as shown in U.S. Pat. No. 4,786,935, the brightness of peripheral portion is measured by four means, the outputs from respective brightness measuring means is calculated, and the mean value of the outputs is used as the measured brightness value of the peripheral portion.

According to the above described embodiments, if the measured brightness value of an area with lower brightness includes photometrical error due to the influence of adjacent brighter area, proper controlling brightness value can be provided and the possibility of optimal exposure control is increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exposure controlling apparatus of a camera, comprising:

first brightness measuring means for measuring brightness of a first area to output a first value corresponding to the measured brightness;

second brightness measuring means for measuring brightness of a second area around said first area to output a second value corresponding to the measured brightness;

photographing magnification detecting means for detecting photographing magnification, which changes in accordance with a focal length and a distance to an object from the camera;

correcting value setting means for setting a correcting value based on the photographing magnification;

first comparing means for comparing said first and second values; and correcting means for correcting, when it is determined by said comparing means that said second value is larger than said first value, said first value by the correcting value.

2. An exposure controlling apparatus according to claim 1, wherein
said correcting means is activated when the difference between said second and first values is larger than a prescribed value.

3. An exposure controlling apparatus according to claim 2, wherein said correcting value setting means includes means for setting the correcting value in accordance with the difference between said second and first values.

4. An exposure controlling apparatus according to claim 1, further comprising
prohibiting means for prohibiting correction by said correcting means under a prescribed condition.

5. An exposure controlling apparatus according to claim 4, further comprising
focal length detecting means for detecting focal length, wherein
said prohibiting means is activated when the focal length is shorter than a prescribed focal length.

6. An exposure controlling apparatus according to claim 4, further comprising:
means for comparing the photographing magnification with a prescribed magnification, and
means for activating said prohibiting means when the photographing magnification detected by said photographing magnification detecting means is smaller that said prescribed magnification.

7. An exposure controlling apparatus according to claim 1, wherein said correcting value setting means includes means for setting said correcting value so that said correcting value increases in accordance with a decrease of said photographing magnification detected by said photographing magnification detecting means.

8. An exposure controlling apparatus according to claim 3, wherein said correcting value setting means includes means for setting said correcting value so that said correcting value increases in accordance with an increase of the difference between said first and second values.

9. An exposure controlling apparatus according to claim 4, further comprising:
means for detecting a distance to an object to be photographed;
second comparing means for comparing said detected distance with a first prescribed distance; and
first means for activating said prohibiting means when said second comparing means discriminates that said detected distance is longer than said first prescribed distance.

10. An exposure controlling apparatus according to claim 9, further comprising:
third comparing means for comparing said detected distance with a second prescribed distance; and
second means for activating said prohibiting means when said third comparing means discriminates that said detected distance is smaller than said second prescribed distance, said first prescribed distance being longer than said second prescribed distance.

11. An exposure controlling apparatus according to claim 4, further comprising:
means for detecting a distance to an object to be photographed;
second comparing means for comparing said detected distance with a prescribed distance; and
means for activating said prohibiting means when said second comparing means discriminates that said detected distance is smaller than said prescribed distance.

12. An exposure controlling apparatus according to claim 4, further comprising:
means for detecting distances to objects to be photographed at a plurality of predetermined points to produce a plurality of distance signals each representative of a detected distance, and
means for activating said prohibiting means in accordance with said plurality of distance signals.

13. An exposure controlling apparatus according to claim 4, further comprising:
means for comparing said detected photographing magnification with a prescribed magnification, and
means for activating said prohibiting means when said detected photographing magnification is larger than said prescribed magnification.

14. An exposure controlling apparatus according to claim 6, further comprising:
second comparing means for comparing the photographing magnification with a first prescribed magnification;
first activating means for activating said prohibiting means when said second comparing means discriminates that the photographing magnification is smaller than said first prescribed magnification;
third comparing means for comparing the photographing magnification with a second prescribed magnification larger than said first prescribed magnification; and
second activating means for activating said prohibiting means when said third comparing means discriminates that the photographing magnification is larger than said second prescribed magnification.

15. An exposure controlling apparatus of a camera comprising:
first brightness measuring means for measuring brightness of a first area to output a first value corresponding to the measured brightness;
second brightness measuring means for measuring brightness of a second area around said first area to output a second value corresponding to the measured brightness;
brightness comparing means for comparing said first and second values;
correcting value setting means for setting a correcting value based on information having no relation with said first and second values;
value correcting means for correcting, when it is determined by said comparing means that said second value is larger than said first value, said first value by said correcting value;
prohibiting means for prohibiting correction by said value correcting means under a prescribed condition having no relation with said first value; and
exposure value determining means for determining an exposure value based on said corrected first value and said second value when correction by said value correcting means is not prohibited by said prohibiting means and for determining said exposure value based on said first and second values when correction by said value correcting means is prohibited by said prohibiting means.

16. An exposure controlling apparatus according to claim 15, further comprising
   focal length detecting means for detecting a focal length, wherein
   said prohibiting means is activated when the focal length is shorter than a prescribed focal length.

17. An exposure controlling apparatus according to claim 15, further comprising
   photographing magnification detecting means for detecting photographing magnification, wherein
   said prohibiting means is activated when the photographing magnification detected by said photographing magnification detecting means is smaller than a prescribed magnification.

18. An exposure controlling apparatus according to claim 15, wherein said correcting value setting means includes:
   means for detecting photographing magnification, and
   means for setting a correcting value based on said detected photographing magnification.

19. An exposure controlling apparatus according to claim 18, wherein said correcting value setting means includes:
   means for increasing said correcting value in accordance with a decrease of said photographing magnification detected by said photographing magnification detecting means.

20. An exposure controlling apparatus according to claim 18, further comprising:
   means for discriminating whether or not a condition of an object to be photographed is a predetermined condition, and
   means for activating said prohibiting means when said discriminating means discriminates that said condition of said object is not said predetermined condition.

21. An exposure apparatus according to claim 20, wherein said discriminating means includes:
   means for detecting distances to objects to be photographed at a plurality of predetermined points to produce a plurality of distance signals each representative of a detected distance, respectively, wherein said means for discriminating discriminates object condition in accordance with said plurality of distance signals.

22. An exposure controlling apparatus according to claim 15, further comprising:
   means for detecting a distance to an object to be photographed;
   distance comparing means for comparing said detected distance with a prescribed distance; and
   means for activating said prohibiting means when said distance comparing means discriminates that said detected distance is longer than said prescribed distance.

23. An exposure controlling apparatus of a camera comprising:
   first brightness measuring means for measuring brightness of a first area to output a first value corresponding to the measured brightness;
   second brightness measuring means for measuring brightness of a second area around said first area to output a second value corresponding to the measured brightness;
   comparing means for comparing said first and second values to detect a difference between said first and second values;
   correcting means for correcting said first value when said difference is larger than a prescribed value;
   photographing magnification detecting means for detecting photographing magnification; and
   prohibiting means for prohibiting correction by said correcting means when the detected magnification is less than a prescribed magnification.

24. An exposure controlling apparatus of a camera, comprising:
   first brightness measuring means for measuring brightness of a first area to output a first value corresponding to the measured brightness;
   second brightness measuring means for measuring brightness of a second area around said first area to output a second value corresponding to the measured brightness;
   correcting value setting means for setting a correcting value based on information having no relation with said first and second values;
   value correcting means for correcting said first value by said correcting value;
   optical state detecting means for detecting an optical state based on said corrected first value and said second value; and
   exposure value determining means for determining an exposure value based on said corrected first value and said second value according to said detected optical state.

25. An exposure controlling apparatus according to claim 24, further comprising:
   comparing means for comparing said first which is not corrected and second values; and
   photographing magnification detecting means for detecting photographing magnification; wherein
   said correcting means includes means for setting a correcting value based on the photographing magnification and means for correcting the first value by the correcting value.

26. An exposure controlling apparatus according to claim 24, wherein
   said correcting means is activated when it is determined by said comparing means that said second value is larger than said first value.

27. An exposure controlling apparatus according to claim 24, wherein said correcting value setting means includes:
   means for detecting photographing magnification, and
   means for setting a correcting value based on said detected photographing magnification.

28. An exposure controlling apparatus according to claim 24, wherein said exposure value determining means includes:
   means for averaging said corrected first value and said second value with weighting values to determine said exposure value.

29. An exposure controlling apparatus according to claim 24, further comprising:
   illuminating means for illuminating an object to be photographed by a flash light emission;
   backlight condition detecting means for detecting a backlight condition in accordance with said corrected first value and said second value; and
   means for controlling said illuminating means in accordance with said backlight condition to operate said illuminating means when said backlight condition detecting means detects said backlight condition and for interrupting the operation of said illuminating means when said backlight condition detecting means detects no backlight condition.

30. An exposure controlling apparatus according to claim 29, further comprising:
flash control value calculating means for calculating a flash control value to be transmitted to said illuminating means, and
flash control value correcting means for correcting said flash control value in accordance with said corrected first value and said exposure value.

31. An exposure controlling apparatus according to claim 30, wherein said flash control value correcting means includes means for decreasing a contribution of flash light emissions towards an exposure amount.

32. An exposure controlling apparatus according to claim 24, further comprising:
means for comparing said first and second values with each other; and
means for activating said correcting means in accordance with an output of said comparing means.

33. An exposure controlling apparatus of a camera, comprising:
first brightness measuring means for measuring brightness of a first area and for outputting a first value corresponding to said first measured brightness;
second brightness measuring means for measuring brightness of a second area around said first area and for outputting a second value corresponding to said second measured brightness;
brightness comparing means for comparing said first and second values;
correcting value setting means for setting a correcting value based on said first and second values;
correcting values for correcting, when said comparing means discriminates that said second value is larger than said first value, said first value by said correcting value;
prohibiting means for prohibiting correction by said correcting means under a prescribed condition having no relation with said first value;
exposure value determining means for determining an exposure value based on said corrected first value and said second value when correction by said correcting means is not prohibited by said prohibiting means, and for determining said exposure value based on said first and second values when correction by said correcting means is prohibited by said prohibiting means.

34. An exposure controlling apparatus of a camera, comprising:
first brightness measuring means for measuring brightness of a first area for outputting first value corresponding to said first measured brightness;
second brightness measuring means for measuring brightness of a second area around said first area for outputting a second value corresponding to said second measured brightness;
correcting value setting means for setting a correcting value based on said first and second values;
correcting means for correcting said first value by said correcting value;
optical state detecting means for detecting an optical state based on said corrected first value and said second value; and
exposure value determining means for determining an exposure value based on said corrected first value and said second value according to said detected optical state.

* * * * *